June 9, 1959  R. W. THOMAS  2,890,073

SEPARABLE JOINT FOR TUBULAR MEMBERS

Filed March 27, 1952

INVENTOR.
Raymond W. Thomas

BY
Attorneys

United States Patent Office 2,890,073
Patented June 9, 1959

2,890,073

SEPARABLE JOINT FOR TUBULAR MEMBERS

Raymond W. Thomas, Pasadena, Calif.

Application March 27, 1952, Serial No. 278,974

6 Claims. (Cl. 287—119)

(Granted under Title 35, U.S. Code (1952), sec. 266)

The invention described herein may be manufactured and used by or for the Government of the United States of America for governmental purposes without the payment of any royalties thereon or therefor.

This invention relates to mechanism for separably connecting in concentric relation two members the outer of which has a substantially cylindrical inner surface, and the inner of which has a substantially cylindrical outer surface.

The invention is described with special reference to its use as part of a rocket mechanism, although it will be apparent that it may be used in other devices.

A typical modern military rocket may be made up of separate sections, a head and a motor. The two sections may be manufactured and stored as separate units, to be assembled, and sometimes disassembled, in the field. It is therefore desirable that mechanism be provided for quickly locking the two sections together to form a rigid unit. It is a further requisite that the mechanism be operable without special tools, that it not materially increase the weight or the radial or other dimensions of the rocket, that it retain the two sections in alignment while preventing rotary as well as longitudinal movement therebetween, and that it lend itself to rapid disassembly of the rocket.

It is an object of the invention to provide a separable joint of the type indicated and having the advantages just enumerated.

Other objects and many of the attendant advantages of this invention will be readily appreciated as the same becomes better understood by reference to the following description.

Figure 1:
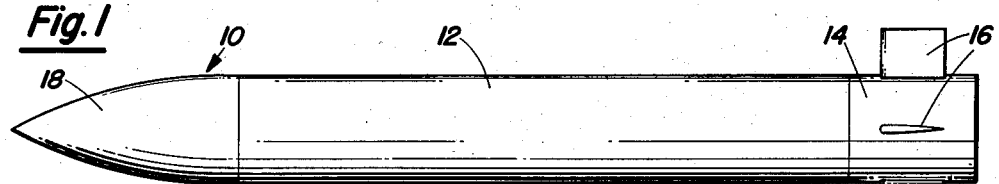
Fig. 1 is a diagrammatic view in side elevation of a rocket embodying the invention.
Figure 2:
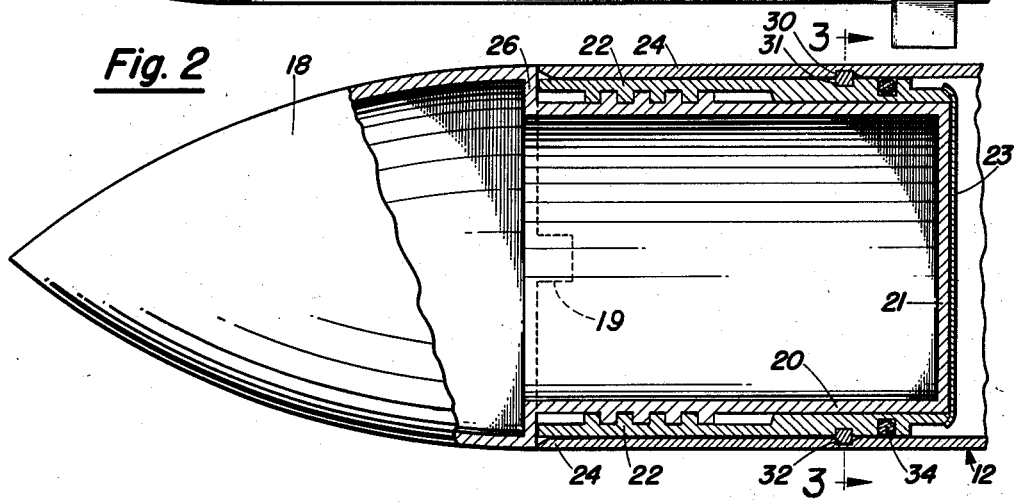
Fig. 2 is a fragmentary enlarged view, partly in section, of the forward portion of the rocket, showing the separable joint.
Figure 3:
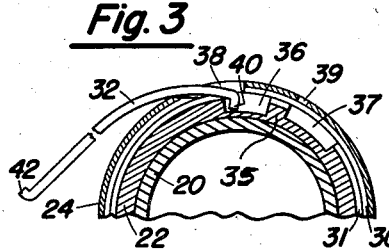
Fig. 3 is a sectional view taken on the line 3—3 of Fig. 2, but showing the joint at the beginning of the locking operation.
Figure 4:
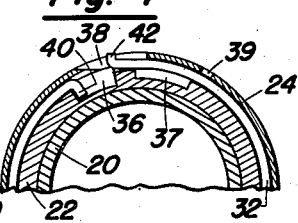
Fig. 4 is a similar view showing the joint at a later stage of the locking operation.

The rocket shown in Fig. 1 comprises a head 10, a main body section 12, and a nozzle section 14, the main body section and nozzle section together forming the rocket motor. The nozzle section may be provided with control surfaces 16 of known design. As seen in Fig. 2, the head is formed with an ogive 18 for reception of high explosive, and a hollow shank 20 having a rear wall 21 and designed to house fuse or other mechanism, not shown. The main body section 12 houses the propellant, and is united to the head by the head closure sleeve now to be described.

The closure sleeve comprises a hollow cylindrical member 22 internally threaded to engage an externally threaded portion of the shank 20 as shown in Fig. 2. A milled slot 19 is formed in the open end of member 22 to receive a bar wrench to facilitate turning the member inside flange 24. The rear end of member 22 is closed by a sealing diaphragm 23 soldered or otherwise secured thereto.

The forward end of the main body section 12 is formed as a cylindrical flange 24 which engages the outer surface of member 22 in telescoping relation and abuts an internal shoulder 26 formed on the head 10. To the rear of shoulder 26 the member 22 and flange 24 are formed with mating grooves 30, 31 which, in the assembled positions shown, register with each other to receive a lock wire 32 of rectangular cross section. A second groove near the rear end of member 22 receives a sealing ring 34 of O-ring form to prevent leakage therepast. The forward end of flange 24, and the groove 30, are beveled as shown to permit the main body section 12 to be slid upon member 22 without disturbing the sealing ring.

Although Figs. 3 to 8 show the shank 20 of the rocket head in place, it will be understood that the head will normally not be put in place until after the assembling or joining operations described in connection with these figures have been completed.

Figure 5:
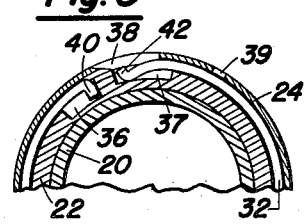
Fig. 5 is a similar view showing a still later stage.
Figure 6:
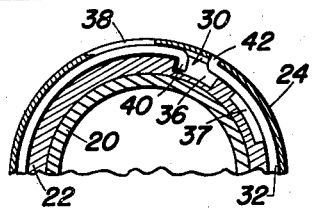
Fig. 6 is a similar view showing the joint fully locked.

In Figs. 3-6, it is seen that the groove 31 in member 22 is deepened to form spaced recesses 36, 37 separated by a wall section 35, while the flange 24 is formed with spaced apertures 38, 39 connecting groove 30 with the exterior of the rocket casing. The lock wire 32 is formed with an inturned end 40 designed to be inserted through aperture 38 into recess 36 when the two are brought into alignment as in Fig. 3. The member 22 is then rotated in the clockwise direction relative to the flange 24, drawing the lock wire into the annular cavity formed by grooves 30, 31, until the parts are in the relation shown in Fig. 4, with the rear, outturned end 42 of wire 32 still extending from the rocket body through aperture 38. Member 22 is then rotated counterclockwise until end 40 abuts against the right-hand end of recess 36, whereupon end 42 can be pressed inwardly into recess 37 as shown in Fig. 5. The member 22 is then rotated in the clockwise direction until end 42 registers with aperture 39, whereupon its resilience causes it to enter the aperture as shown in Fig. 6, locking member 22 and flange 24 against both longitudinal and rotary motion. If now force is exerted tending to rotate member 22 in either direction, it will be resisted by end 42 bearing against one or the other side of aperture 39 and will be backed up by the wall section 35; rotary movement is therefore limited to a small angle, while relative longitudinal movement of these parts, in response to the high accelerations to which the device is subjected in operation, is prevented by the shear strength of the lock wire.

In order to release the joint and separate the parts from each other, the procedure above described is reversed by first rotating member 22 counterclockwise until wall section 35 abuts against end 40, and recess 37 lies directly under end 42. End 42 is then depressed into recess 37, and member 22 is rotated further in the counterclockwise direction to permit end 42 to move outwardly into aperture 38. Further counterclockwise rotation of member 22 will then move the parts to the positions shown in Fig. 3.

Figure 7:
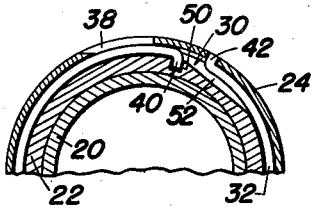
Fig. 7 is a view similar to Fig. 6, but showing a modified form of the invention.

In the modified form of the invention shown in Fig. 7, the parts are the same, and are designated by the same reference numerals, as in Figs. 3-6, except as hereinafter noted. The member 22 is in this case formed with a recess 50 which snugly receives end 40, and groove 31 is deepened to form a communicating slot 52 which permits end 42 to be depressed so that member 22 may be rotated counterclockwise until said end registers with aperture 38, whereupon the lock wire may be withdrawn. By reversing the process the lock wire may be inserted. The joint thus formed prevents rotation of member 22 counterclockwise relative to flange 24, but does not positively prevent its rotation in the clockwise direction.

Figure 8:
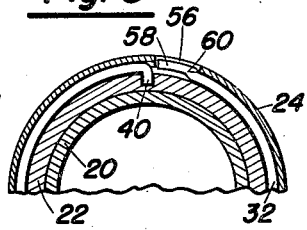
Fig. 8 is a similar view showing a further modified form.

In the form of the invention shown in Fig. 8, the flange 24 is formed with but one aperture, 56, and the member 22 with but one recess, which receives the end 40. The other end 58 of the lock wire 32 is slightly bent or offset to form a shoulder 60 which is normally held by the resiliency of the wire in contact with the right-hand end of aperture 56, while the free end of the wire is positioned to abut against the left-hand end of the aperture. In this way, member 22 is prevented from rotating counterclockwise, but is not positively prevented from rotating clockwise. The lock wire is sufficiently flexible that end 58 may be raised, by means of a screwdriver or the like, until it clears flange 24, whereupon member 22 may be rotated counterclockwise until the entire lock wire is moved to the exterior of flange 24. When this point is reached, end 40 with its recess is in registry with aperture 56, and the wire may be lifted free of the apparatus. Insertion of the wire follows the reverse procedure, the wire being fed into the mating grooves 30, 31 by rotating member 22 until end 58 registers with aperture 56 as shown.

It will be seen that a joint similar to any of those above described may be used to secure the nozzle section 14 to the main body section 12. In all forms of the invention, the joint adapts itself to the severe space and weight requirements of rocket construction, occupying a minimum of space in radial extension, and adding very little weight to the device.

Obviously many modifications and variations of the present invention are possible in the light of the above teachings. It is therefore to be understood that within the scope of the appended claims the invention may be practiced otherwise than as specifically described.

What is claimed is:

1. In a device comprising an outer and an inner member having mating cylindrical surfaces rotatable relative to each other, a joint comprising an inner annular groove in the outer member and a mating outer annular groove in the inner member, spaced recesses in the inner member communicating with the groove in the inner member, spaced apertures in the outer member communicating with the groove in the outer member, and a resilient lock wire having an inturned end insertible through one of said apertures into lost-motion engagement with one of said recesses, whereby the remainder of said wire may be drawn into said grooves by rotation of said members relative to each other, said wire having in addition an outturned rear end movable by the resilience of the wire into locking engagement with the other of said apertures when said outturned end has been moved into registry with said other aperture.

2. In a device comprising outer and inner members having mating cylindrical surfaces rotatable relative to each other, a joint comprising mating annular grooves in said surfaces, the groove in the inner member being enlarged to form two spaced recesses, two spaced apertures in the outer member connected to the groove in the outer member, and a resilient lock wire having a forward end insertible through one of said apertures to a position wherein it engages one of said recesses, whereby the remainder of said wire may be drawn into said grooves by rotation of said members relative to each other, said wire having in addition an outturned rear end movable by the resilience of the wire into locking engagement with the other of said apertures when said outturned end has been moved into registry with said other aperture.

3. The invention defined in claim 2, wherein the forward end of said wire is inturned and has lost-motion engagement with said one recess to permit limited rotation thereof relative to the inner member.

4. In a device comprising relatively rotatable telescoping members having mating cylindrical surfaces, a joint comprising mating annular grooves in said surfaces, the groove in the inner member being deepened to form two spaced recesses, the groove in the outer member being deepened to form two spaced apertures, and a resilient lock wire having an inturned forward end and an outturned rear end and insertible tangentially thru one of said apertures movable by relative rotation of the members to a position wherein its forward end engages one of said recesses, its rear end engages the other of said apertures, and the remainder of the wire lies in said mating grooves.

5. In a device comprising an outer tubular member and an inner cylindrical member in telescoping and rotatable relation thereto, a joint comprising an inner annular groove in the outer member and a mating outer annular groove in the inner member, spaced recesses in the inner member communicating with said outer groove, spaced apertures in the outer member communicating with said inner groove, and a resilient lock wire having an inturned end insertible through one of said apertures into lost-motion engagement with one of said recesses whereby the remainder of said wire may be drawn into said grooves by rotation of said members relative to each other, said lock wire having in addition an outturned end movable by the resilience of the wire into locking engagement with the other of said apertures when said outturned end has been moved into registry with said other aperture.

6. The invention defined in claim 5, wherein said lock wire and said grooves are of generally rectangular cross section.

References Cited in the file of this patent
UNITED STATES PATENTS

| | | |
|---|---|---|
| 1,464,386 | Ingram | Aug. 7, 1923 |
| 2,403,368 | Howard | July 2, 1946 |